United States Patent [19]
Beazley

[11] 3,866,265
[45] Feb. 18, 1975

[54] GLASS WASHING MACHINES
[75] Inventor: Rodney Thomas Beazley, Kent, England
[73] Assignee: Glassmaster Company Limited, London, England
[22] Filed: Aug. 16, 1973
[21] Appl. No.: 388,777

[30] Foreign Application Priority Data
Aug. 16, 1972  Great Britain.................... 38263/72

[52] U.S. Cl. ................................................. 15/75
[51] Int. Cl............................................. A47l 15/38
[58] Field of Search ............ 15/75, 76, 56, 101, 164

[56] References Cited
UNITED STATES PATENTS

| | | | |
|---|---|---|---|
| 872,702 | 12/1907 | Vodoz.................................... | 15/76 |
| 2,215,400 | 9/1940 | Malpass................................. | 15/75 |
| 2,253,539 | 8/1941 | Steinhilber............................. | 15/75 |
| 2,268,721 | 1/1942 | Ossowsky............................ | 15/75 X |
| 2,955,304 | 10/1960 | Noe ....................................... | 15/75 |

Primary Examiner—Edward L. Roberts
Attorney, Agent, or Firm—Watson, Cole, Grindle & Watson

[57] ABSTRACT

A glass washing machine including a casing having an opening in the top to receive a glass, bottom upwards, a retractable plunger projecting up through the opening to engage the bottom of the inverted glass to be retracted by it, and valves actuated by the movement of the plunger for admitting jets of detergent liquid, preceded and followed by jets of water, through the plunger to the inside of the glass and through external nozzles to its outside, as the glass is pushed down and lifted out again. There are also three sets of brushes, an inner set rotating about the axis of the glass to wipe the inside of a small glass, an intermediate set rotating about the axis of the glass to wipe the outside of a small glass or the inside of a large glass, and an outer set of brushes each rotating about its respective axis to wipe the outside of a larger glass with or without a handle. The brushes may be driven by an electric motor or manually by the movement of the plunger.

11 Claims, 7 Drawing Figures

PATENTED FEB 18 1975　　　　　　　　　　　　3,866,265

GLASS WASHING MACHINES

This invention relates to glass washing machines, the term "glass" being used herein to include vessels of other materials of roughly cylindrical form, for example plastic beakers or metal tankards.

Various forms of glass washing machine have been proposed in the past, generally of an elaborate and complicated type, and the object of the present invention is to provide a simple machine, which nonetheless will effectively wash and rinse glasses, for example in public houses, hotels, restaurants and other establishments where a large number of glasses require washing.

According to the present invention a glass washing machine includes a casing having an opening in the top to receive a glass, bottom upwards, a retractable plunger projecting up through the opening to engage the bottom of the inverted glass to be retracted by it, and valves actuated by the movement of the plunger for admitting jets of washing liquid to the inside and outside of the glass as it is pushed down and/or lifted out again.

Preferably the machine includes one or more brushes or the like (for example sponges or pads) for wiping the inside or the outside, and preferably both, of the glass. Means may be provided for rotating the brush or brushes either about the axis of the glass or each about its own axis. In particular one or more brushes may be rotated about the axis of a glass to wipe its inside surface, whilst each of a number of outer brushes, distributed around the axis of a glass, may be rotated about its own axis to wipe the outside of a glass, particularly a glass having a handle.

In one form of the invention there are three sets of brushes, an inner set rotating about the axis of the glass to wipe the inside of a small glass, an intermediate set rotating about the axis of the glass to wipe the outside of a small glass or the inside of a large glass, and an outer set of brushes each rotating about its respective axis to wipe the outside of a larger glass with or without a handle.

Preferably means is provided for supplying liquid through the plunger to project jets of liquid into the interior of the glass. Valves actuated by the plunger may then be provided to admit detergent and/or sterilising material for part of the cycle, in particular when the glass is at its lowest position. Preferably valves are also provided for projecting jets of rinsing water when the glass is at higher positions. This may be effected both when the glass is being pressed down and when it is rinsing again, so that the glass will be subjected to a cycle comprising an initial rinse to wet it and swill away any matter within it, a detergent and/or sterilising flush, and a final rinse to flush away the detergent and/or sterilising media.

Preferably jets of liquid are also directed at the outside of the glass. Preferably these are above the brushes that wipe the outside of the glass so that as the glass rinses out of the machine the outside will be flushed with liquid after its last contact with the brushes.

Similarly if the inside jets from the plunger are near the top a similar result will be achieved for its inside. Preferably the top of the plunger is fluted so as to admit rinsing liquid to the top of the glass.

The rotation of the brushes may be power driven or manually driven. Thus in one form of the invention employing manual operation downward pressure on the plunger provides power for rotation of one or more brushes, for example by means of a coarse-pitched screw. Thus the depression of the plunger may cause rotation of a rotor coaxial with the plunger and glass and carrying brushes to engage both inside and outside surfaces of suitable glasses.

The invention may be put into practice in various ways but two specific embodiments will be described by way of example with reference to the accompanying somewhat diagrammatic drawings, in which.

Figure 1:
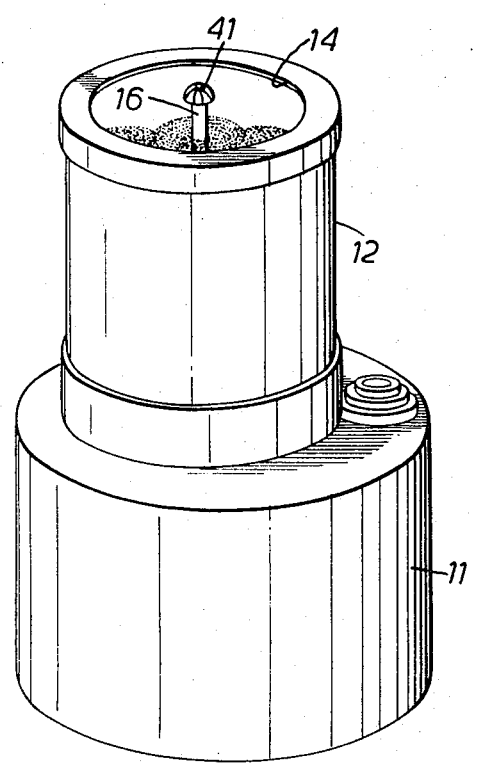
FIG. 1 is a perspective view of an electrically driven glass-washing machine suitable for use in public houses.

The machine shown in FIGS. 1 to 6 comprises a casing in the form of a lower housing 11 of cylindrical form with its axis vertical and an upper housing 12 also of cylindrical form with its axis vertical eccentrically supported on or integral with the lowering housing. The upper housing has an opening 14 in the top to receive inverted glasses in a range of sizes. A tubular valve housing 15 projects upwards and downwards co-axially from the bottom of the upper housing and accommodates a plunger 16 the upper end of which projects from the top of the valve housing through the opening 14 so that it can be engaged by a glass inserted bottom upwards through the opening and pressed down. Near its lower end the upper housing has in it a fixed platform 17.

Mounted to rotate about the valve housing is a rotor 20 comprising a rotor sleeve 21 and a rotor platform 22.

Mounted in the upper housing are three sets of brushes, an inner brush 25, an intermediate set of brushes 26 and an outer set of brushes 27. The inner brush is a single brush of annular form and is carried by the top of the rotor sleeve 21 from which it is readily detachable so that it can be lifted off for cleaning. The intermediate set of brushes comprises three cylindrical brushes each mounted on a shaft 28 connected by an elastomeric sleeve 29 to one of three posts 30 upstanding from the rotor platform 22. The outer set of brushes comprises six cylindrical brushes 27, each having a shaft 31 connected by an elastomeric sleeve 32 to one of six stub-shafts 33 mounted in bearings in the bottom of the upper housing and the fixed platform 17.

The inner brush serves to wipe the inside surfaces of small glasses; the intermediate brushes wipe the outer surfaces of small glasses or the inner surfaces of large glasses; and the outer brushes wipe the outer surfaces of large glasses. The elastomeric sleeves 29 permit the intermediate brushes to flex inwards or outwards so as to permit the insertion of glasses whose diameter is close to their pitch circle diameter. Similarly the elastomeric sleeves 32 allow the outer brushes to flex outwards. Alternatively if desired the pitch circles of the intermediate and or outer brushes may be made adjustable, in case a user has a predominance of glasses which are of an exact size that would not readily push between the inner and intermediate or outer and intermediate brushes.

The outer brushes are of the nature of mops with long flabby strands or soft bristles so as to wipe the whole of the outer surface of the glass. If desired, however, the outer brushes may be asymmetrically distributed about the axis so that a large glass with a handle can be oscillated as it is pressed down and raised up to facilitate wiping of the whole of its outer surface except that actually shielded by the handle.

The brushes are driven by an electric motor 35 through a system of gears. Thus the shaft of the motor carries a pinion 36 meshing with an idler 37 which in turn meshes with a small gear 38 carried by the rotor 20, which is accordingly driven by the motor so as to rotate the inner brush and the intermediate set of brushes. The rotor also carries a large gear 39 meshing with a number of gears 40 each carried by one of the stub-shafts 33 which drive the outer brushes. Accordingly as the inner brushes and intermediate brushes rotate about the central axis in one direction, the outer brushes rotate each about its own axis in the opposite direction.

Figure 6:
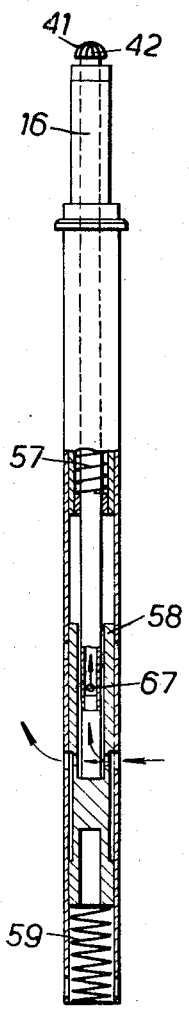
FIG. 6 is a view similar to part of FIG. 5 with the plunger and valve in a different position.
Figure 2:
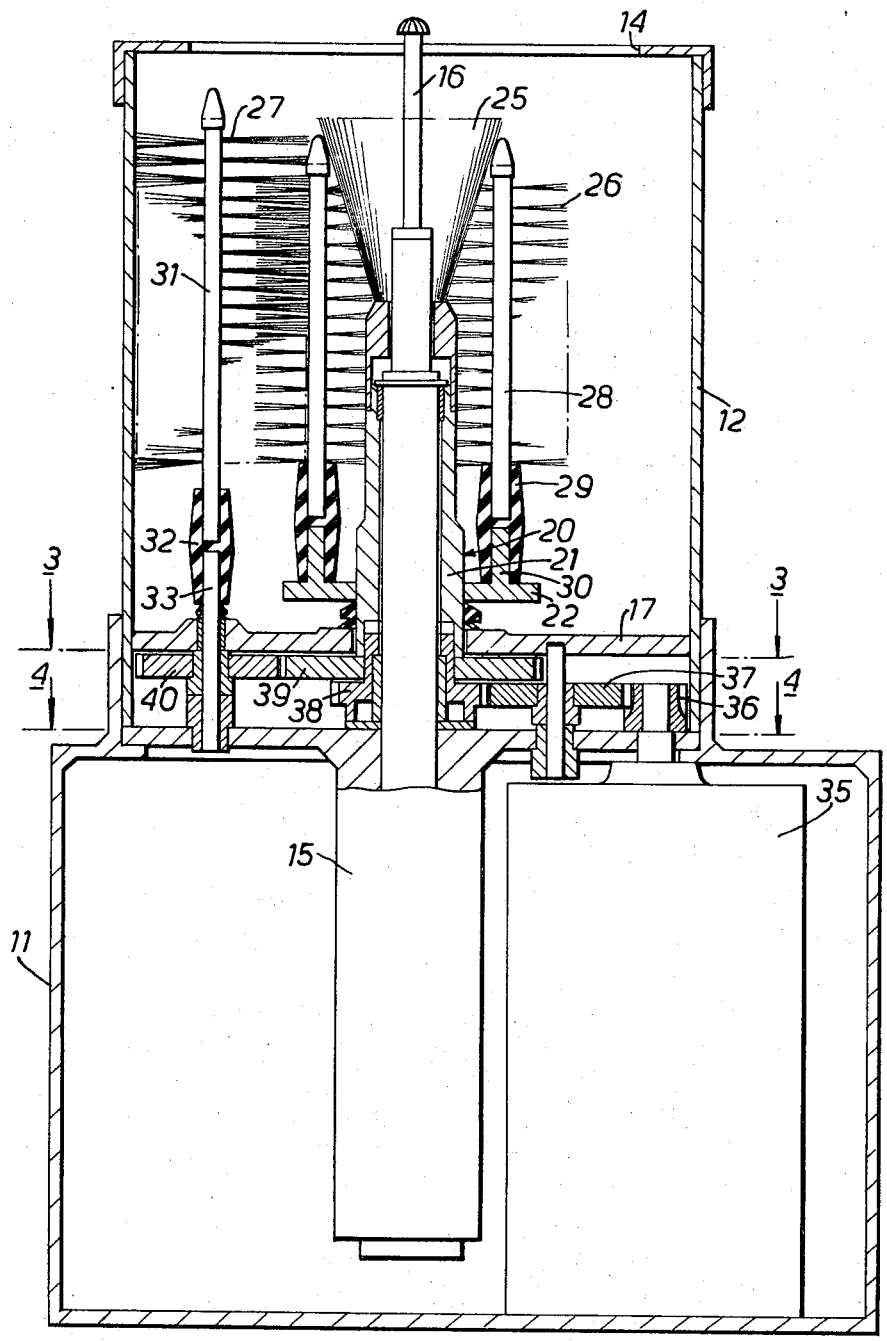
FIG. 2 is a sectional elevation of the machine generally on the line 2—2 of FIG. 3 showing the drive to the brushes but omitting other parts.
Figure 3:
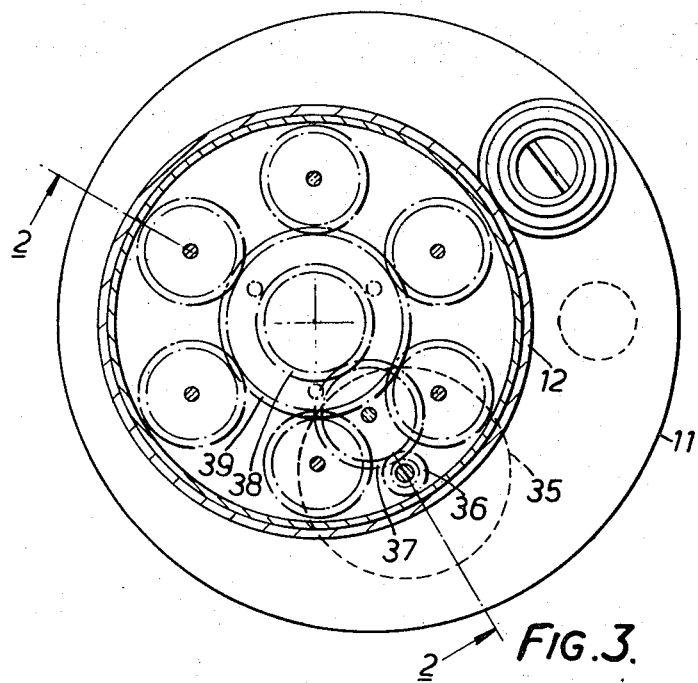
FIG. 3 is a sectional plan view on a reduced scale on the line 3—3 of FIG. 2.
Figure 4:
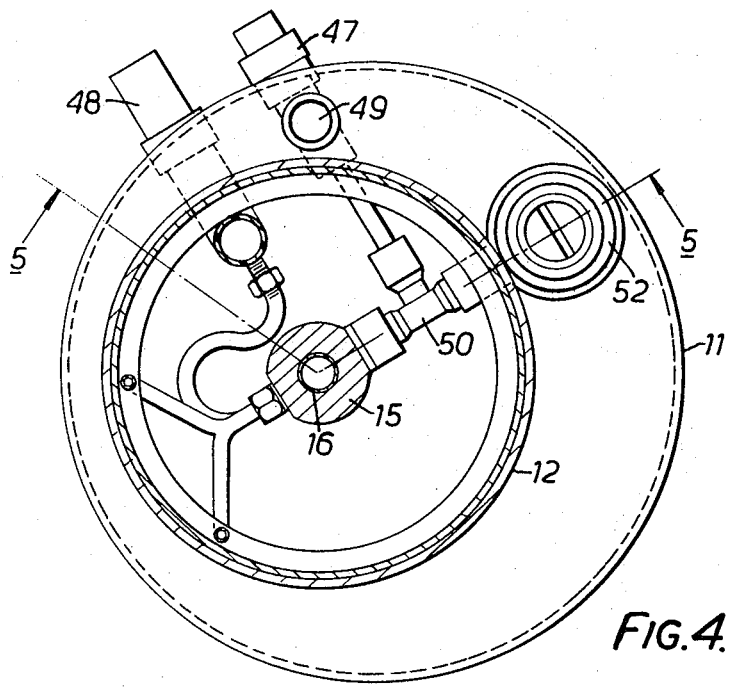
FIG. 4 is a sectional plan view on the line 4—4 of FIG. 2 showing water pipes but omitting other parts.
Figure 5:
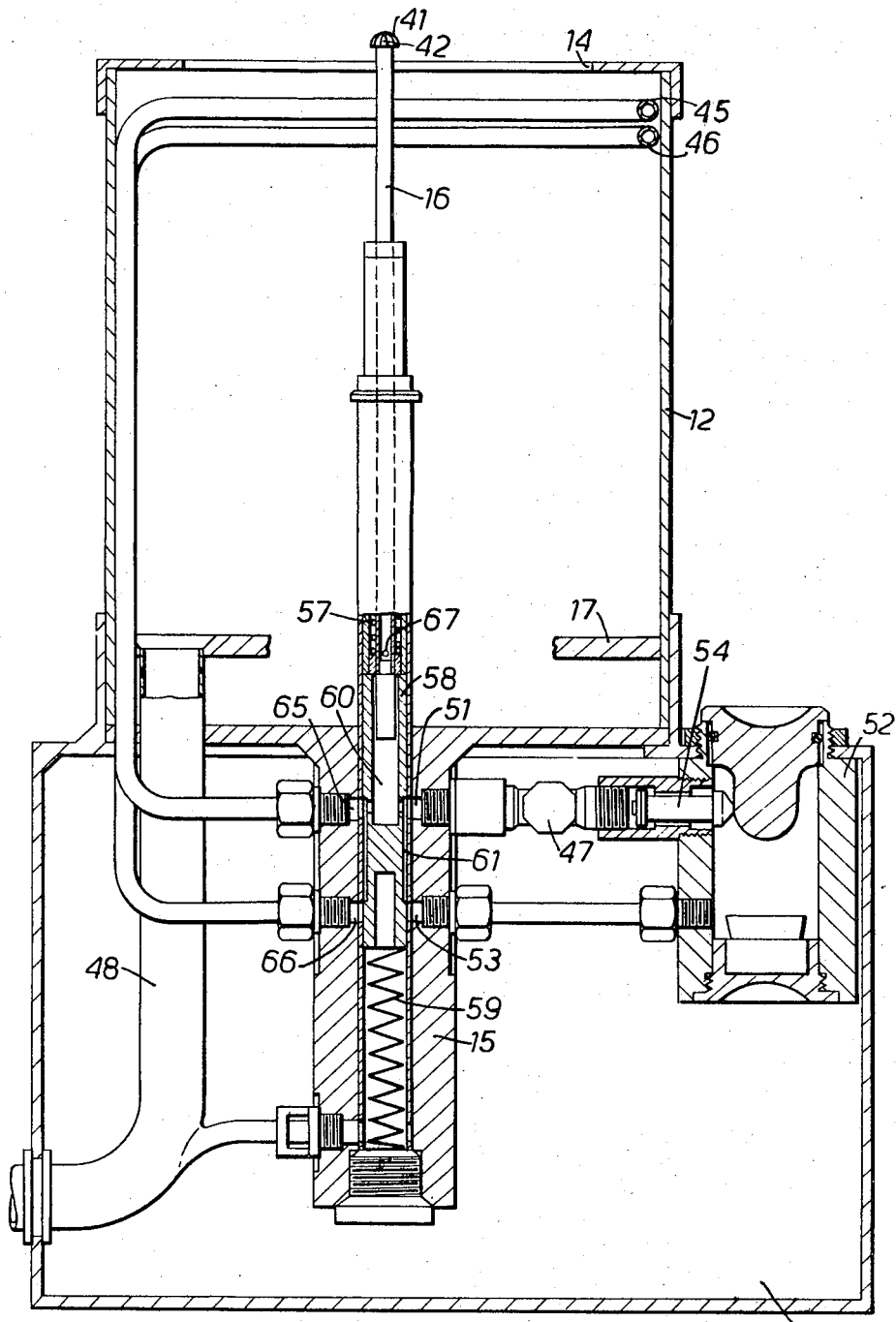
FIG. 5 is a sectional elevation corresponding to FIG. 4 and largely on the line 5—5 of FIG. 4.

FIGS. 4 to 6 show the means for flushing the brushes and glasses with water and detergent solution. The plunger 16 is hollow and its upper end carries a fluted button 41 having in it slots 42 to project jets of liquid to flush the whole of the bottom of an inverted glass as well as the interior of its side wall. The material of the button is suitable for engaging the bottom of the glass without damage, and enabling the plunger to be pressed down by pressing the glass down.

In addition a number of outside nozzles are located round the periphery of the top of the upper housing to flush the outside of a glass. The outside nozzles are afforded by perforations in a pair of annular nozzle pipes 45 and 46 of which the upper pipe 45 projects plain water while the lower pipe projects a detergent solution. The admission of liquid to these nozzles is controlled by the movement of the plunger.

Thus a water inlet 47 is provided to the lower housing as shown in FIGS. 4 and 5 for connection to a supply of water under pressure, while a drain 48 is provided for exhausting used liquid. The water inlet may include a pressure reducing valve 49 and is connected through a T-junction 50 on the one hand to an upper inlet port 51 situated in the valve housing 15 diametrically opposite an upper outlet port 65 connected to the lower end of the pipe 45 delivering fresh water, and, on the other hand, through a device 52 for mixing with the water a detergent material, to a lower inlet port 53 situated diametrically opposite a lower outlet port 66 connected to the lower end of the pipe 46 for delivering detergent solution.

A shut-off valve 54 is interposed between the T-junction and the detergent dispensing device 52 and closes automatically if the cover of the latter is removed, thereby preventing water from gushing out.

The plunger 16 is urged upwards by a spring 57 and its lower end projects into a cavity 60 in a spool valve 58 also urged upwards by a spring 59. The lower end of the plunger is closed but at a point slightly above its lower end it is provided with a lateral port 67. In the uppermost position of the plunger shown in FIG. 5 the lateral port is covered by the valve casing to prevent the admission of liquid to the plunger. The spool valve has a waist 61 of reduced diameter communicating with the cavity in it and cooperating with the inlet ports 51 and 53 and the outlet ports 65 and 66.

Thus the operation is as follows.

With the plunger in its uppermost position of FIG. 5 the waist registers with the upper ports 51 and 65 so that so long as the water is turned on it is continuously sprayed from the upper nozzle pipe 45 into the interior of the upper housing and continuously sprays the brushes. So long as the motor is switched on the brushes rotate.

When an inverted glass is placed over the plunger and pressed down, the initial movement of the plunger brings the lateral port 67 at its lower end into the cavity of the spool valve so that plain water is admitted to the interior of the plunger and projected from its upper end so as to flush the inside of the glass. As already indicated water is also being directed at the outside of the glass through the upper ports and the pipe 45. This continues for a substantial downward movement of the plunger until its lower end engages the spool valve and starts to move it downwards. This cuts off the waist 61 from the upper inlet port 51 and upper outlet port 65, and places it in communication with the lower inlet port 53 and lower outlet port 66. Detergent solution is supplied to the lower inlet port and accordingly will flow both to the plunger to be projected from the inside nozzles at its upper end, and to the lower nozzle pipe 46 to be projected on to the outside of the glass. The brushes rotate as already described to wipe the inner and outer surfaces of the glass, a small glass being wiped by the inner and intermediate brushes or a large glass by the intermediate and outer brushes.

The delivery of detergent continues until the glass is raised again and the reverse operation occurs, the detergent jets, both outer and inner, being replaced by jets for a final water rinse which removes the detergent sterilizing solution. The outer jets 45 are situated above the brushes so that each portion of the outer surface of the glass is flushed with rinsing water after it has parted from contact with any portion of a brush. Similarly the inside jets are carried up with the plunger so as to continue the flushing of the inner surface of the glass after it is out of contact with the brushes.

Figure 7:
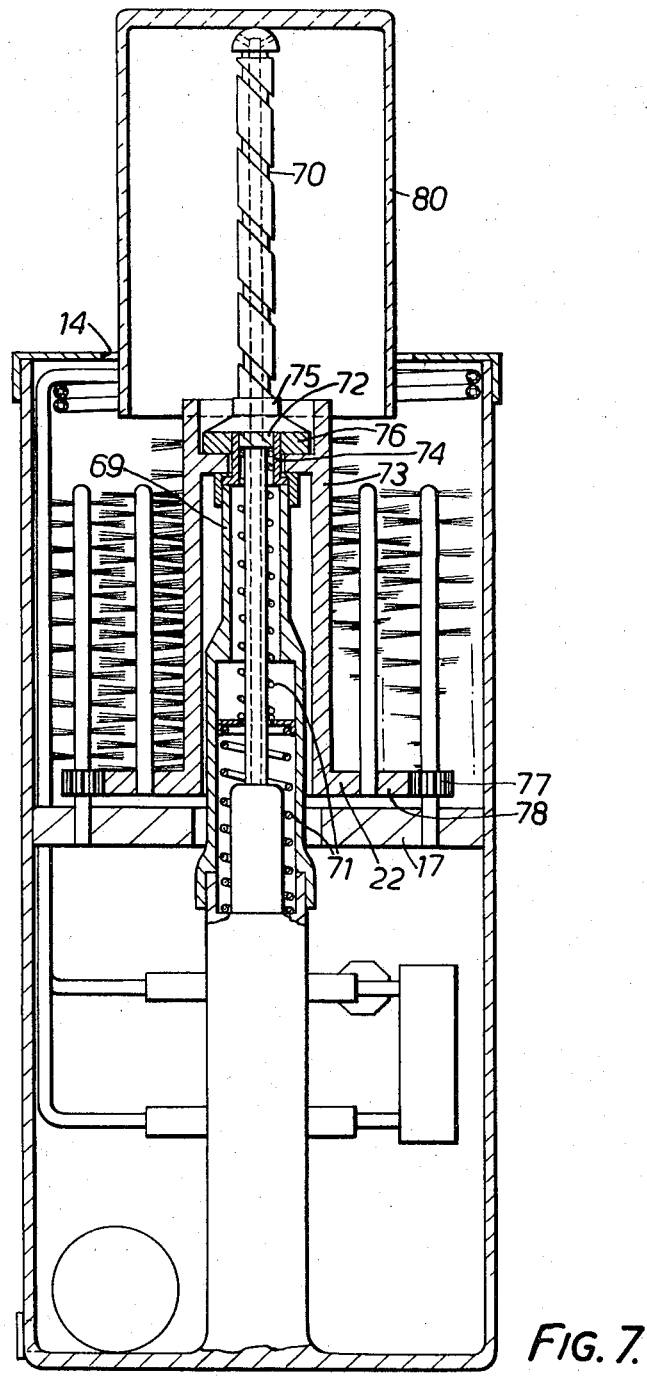
FIG. 7 is a sectional elevation of a modified construction which is operated manually.

FIG. 7 shows a modified form of machine in which the rotation of the brushes is effected manually. The machine is otherwise similar to the electrically driven machine of FIGS. 1 to 6 and it is thought unnecessary to describe or even show many parts that are similar.

In the machine of FIG. 7 the upper part of the valve housing is formed as a tubular spring housing 69. The lower part of the plunger 16 is as in FIGS. 1 to 6 (and is not shown) while the upper part is formed with a coarse pitched square section screw thread 70. One or more springs 71 accommodated in the spring housing bear against a collar 72 on the plunger so as to urge it upwardly towards an extended position in which the helically grooved portion projects from the top of the screw housing and indeed from the top of the machine.

Mounted to rotate about the spring housing is a rotor having a sleeve 73 resting on a bearing 74 at the top of the spring housing and provided with a nut 75 cooperating with the helical groove 70 in the plunger so that when the plunger is pressed down the nut will be rotated in the manner of a spiral ratchet screwdriver. A one-way clutch 76 ensures that the nut rotates on the down stroke of the plunger but free-wheels on the upward return stroke. The rotor sleeve extends down from the nut surrounding the spring housing and carries at the bottom a rotating platform 22 from which a number of brushes project upwards as in the construction of FIGS. 1 to 6. Secured to the spring housing below the rotating platform is the fixed platform 17.

Thus it will be seen that as the plunger is pressed down by an inverted glass 80 the rotor is caused to rotate by the spiral ratchet action, and so rotates the inner and intermediate brushes. The rotation of the rotor also causes rotation of the outer brushes by gearing analogous to that of FIGS. 1 to 6.

Thus each outer brush is provided with a pinion 77 meshing with a gear formed or carried by the periphery of the rotating platform so that as the rotor rotates the outer brushes will rotate in the opposite direction each about its individual axis.

The invention is not restricted to the details of the constructions specifically described, in particular in a modified arrangement the outer brushes may also be caused to rotate about the axis of the glass, or may be caused to oscillate.

What I claim as my invention and desire to secure by Letters Patent is:

1. A glass washing machine including,
   a casing having an opening in its top wall to receive a glass, bottom upwards,
   a retractable plunger projecting upwardly through the opening to engage the bottom of the inverted glass to be retracted by it, the plunger being vertically movable between a first position and a second position lower than the first position,
   jet nozzles adapted to direct jets of liquid to impinge on the outside and inside of the glass.
   brush-like means mounted within the casing or wiping the glass,
   rinsing water supply means for supplying rinsing water,
   washing solution supply means for supplying detergent or sterilising solution.
   and valve means actuated by the plunger to connect the nozzles to the solution supply means when the plunger is adjacent its second position, and to the water supply means when the plunger is between its first and second positions,
   whereby, as the plunger is lowered and raised between its first and second positions, the glass is subjected to a cycle comprising an initial rinse, a detergent and/or sterilising wash and a final rinse.

2. The machine according to claim 1, wherein both the washing and the rinsing water are connected to a pressurized main water supply which produces the jets of liquid.

3. The machine according to claim 1, wherein said brush-like means includes at least one inner brush mounted for rotation about the axis of the plunger for wiping the inner surface of the glass when placed bottom upwards over the plunger, and a plurality of outer brushes mounted for rotation about axes spaced radially outwardly of the plunger axis for wiping the outer surface of the glass.

4. The machine according to claim 1, wherein said brush-like means include an inner brush mounted for rotation about the axis of the plunger for wiping the inner surface of the glass, an intermediate set of brushes each mounted for rotation about the axis of the plunger for wiping a surface of the glass, and an outer set of brushes each mounted for rotation about their respective axes for wiping a surface of the glass.

5. The machine according to claim 4, wherein said intermediate brushes are each flexibly mounted in place so as to be capable of flexing inwardly toward or outwardly of the plunger for respectively wiping the inner and outer surfaces of the glass.

6. The machine according to claim 1, wherein the nozzle for directing jets of liquid to impinge on the inside of the glass is mounted on the plunger, and wherein the supply means include a means for projecting liquid outwardly through the plunger to project liquid from the nozzle mounted thereon into the interior of the glass.

7. The machine according to claim 6, wherein the plunger in its first position projects substantially outwardly through the opening of the casing so that jets of liquid may flush the interior of the glass while at least the major portion of its interior is extended outwardly of the opening of the casing.

8. The machine according to claim 1, wherein the brush-like means extend toward the opening of the casing, and the jet nozzles for directing jets of liquid to impinge on the outside of the glass are located between an upper end of the brush-like means and the top wall of the casing so that, as the glass is raised during movement of the plunger toward its first position, the outer surface thereof will be flushed with liquid after its final contact with said brush-like means.

9. The machine according to claim 1, wherein the brush-like means comprise brushes, and means are provided for power driving the brushes.

10. The machine according to claim 1, wherein the brush-like means comprise brushes, and means are provided to rotate the brushes as the plunger is moved to its second position.

11. The machine according to claim 10, wherein a rotor is mounted on the plunger for rotation therewith, the brushes being mounted on the rotor and spaced apart for engaging the inner and outer surfaces of the glass.

* * * * *